(12) United States Patent
Rabe et al.

(10) Patent No.: US 10,899,634 B2
(45) Date of Patent: Jan. 26, 2021

(54) WATER TREATMENT SYSTEM FOR TREATING WATER FROM OIL PRODUCTION STREAMS

(71) Applicant: SCHLUMBERGER NORGE AS, Stavanger (NO)

(72) Inventors: Karsten Rabe, Porsgrunn (NO); Steinar Asdahl, Porsgrunn (NO)

(73) Assignee: SCHLUMBERGER NORGE AS, Stavanger (NO)

( * ) Notice: Subject to any disclaimer, the term of this patent is extended or adjusted under 35 U.S.C. 154(b) by 209 days.

(21) Appl. No.: 14/912,627

(22) PCT Filed: Aug. 18, 2014

(86) PCT No.: PCT/US2014/051495
§ 371 (c)(1),
(2) Date: Feb. 18, 2016

(87) PCT Pub. No.: WO2015/026722
PCT Pub. Date: Feb. 26, 2015

(65) Prior Publication Data
US 2016/0207791 A1    Jul. 21, 2016

Related U.S. Application Data

(60) Provisional application No. 61/867,278, filed on Aug. 19, 2013.

(51) Int. Cl.
*C02F 1/00* (2006.01)
*C02F 1/24* (2006.01)
(Continued)

(52) U.S. Cl.
CPC .......... *C02F 1/008* (2013.01); *B01D 17/0205* (2013.01); *B01D 17/0214* (2013.01);
(Continued)

(58) Field of Classification Search
None
See application file for complete search history.

(56) References Cited

U.S. PATENT DOCUMENTS 4,681,682 A * 7/1987 White .................. C02F 1/24
                                        210/221.2
5,368,747 A    11/1994 Rymal, Jr. et al.
(Continued)

FOREIGN PATENT DOCUMENTS

WO    2013109345 A1    7/2013

OTHER PUBLICATIONS

International Preliminary Report on Patentability issued in the related PCT application PCT/US2014/051495, dated Feb. 23, 2016 (9 pages).
(Continued)

*Primary Examiner* — Richard C Gurtowski
(74) *Attorney, Agent, or Firm* — Hauptman Ham, LLP; Ronald G. Embry, Jr.

(57) ABSTRACT

A water treatment system includes an inlet line, a tank in fluid communication with the inlet line to receive therefrom a fluid flow comprising hydrocarbons and water. The tank includes components configured to separate the fluid flow into a hydrocarbon flow and a water flow, with the water flow including a residual amount of hydrocarbons. A first outlet line is in fluid communication with the tank to discharge therefrom the water flow. A second outlet line is in fluid communication with the tank to discharge therefrom the hydrocarbon flow. A sensor is associated with one of the inlet line, the first outlet line, and the second outlet line, and a valve is associated with the second outlet line. In addition, a controller is configured to determine a property of at least one of the fluid flow, the hydrocarbon flow, and the water flow using the sensor, and to control the valve based upon (Continued)

the property so as to reduce the residual amount of hydrocarbons in the water flow.

28 Claims, 4 Drawing Sheets

(51) Int. Cl.
| | |
|---|---|
| *B01D 17/02* | (2006.01) |
| *B01D 17/12* | (2006.01) |
| *B03D 1/02* | (2006.01) |
| *B03D 1/14* | (2006.01) |
| *B03D 1/24* | (2006.01) |
| *B01D 19/00* | (2006.01) |
| *C02F 1/40* | (2006.01) |
| *C02F 101/32* | (2006.01) |
| *C02F 103/36* | (2006.01) |
| *C02F 1/20* | (2006.01) |

(52) U.S. Cl.
CPC ......... *B01D 17/12* (2013.01); *B01D 19/0036* (2013.01); *B03D 1/028* (2013.01); *B03D 1/1412* (2013.01); *B03D 1/1456* (2013.01); *B03D 1/1475* (2013.01); *B03D 1/24* (2013.01); *C02F 1/24* (2013.01); *C02F 1/40* (2013.01); *C02F 1/20* (2013.01); *C02F 2101/32* (2013.01); *C02F 2103/365* (2013.01); *C02F 2209/001* (2013.01); *C02F 2209/003* (2013.01); *C02F 2209/005* (2013.01); *C02F 2209/006* (2013.01); *C02F 2209/008* (2013.01); *C02F 2209/01* (2013.01); *C02F 2209/02* (2013.01); *C02F 2209/03* (2013.01); *C02F 2209/28* (2013.01); *C02F 2209/40* (2013.01)

(56) References Cited

U.S. PATENT DOCUMENTS

| | | | | |
|---|---|---|---|---|
| 5,378,353 | A | * | 1/1995 | Koch ................. B01D 17/0208 210/86 |
| 5,996,690 | A | | 12/1999 | Shaw et al. |
| 6,129,839 | A | * | 10/2000 | Mains, Jr. .......... B01D 17/0205 210/188 |
| 6,562,240 | B1 | * | 5/2003 | Clark .................... B01D 17/12 210/703 |
| 7,163,107 | B1 | | 1/2007 | Verosto et al. |
| 2004/0244983 | A1 | | 12/2004 | Appleford et al. |
| 2009/0014392 | A1 | | 1/2009 | McEwen et al. |
| 2009/0173232 | A1 | | 7/2009 | Folkvang |
| 2011/0040501 | A1 | | 2/2011 | Martin et al. |

OTHER PUBLICATIONS

Extended Search Report issued in the related EP Application 14837220.4, dated Jan. 16, 2017 (8 pages).
International Search Report and Written Opinion issued in related International Application No. PCT/US2014/051495 dated Dec. 3, 2014 (13 pages).
Asdahl et al., "Real-Time Automatic Operation and Optimization of Produced-Water Treatment", SPE 167492 presented at the SPE Middle East Intelligent Energy Conference and Exhibition held in Dubai, UAE, Oct. 28-30, 2013, pp. 1-10.
EP Communication pursuant to Article 94-3 issued in the related EP Application 14837220.4, dated Nov. 21, 2017 (7 pages).
B.K. Arvoh, S. Asdahl, K. Rabe, M. Halstensen. 2012, Online Estimation of reject gas and liquid flow rates in compact flotation units for produced water treatment, Flow Measurement and Instrumentation 24, 63-70.
B.K. Arvoh, S. Asdahl, K. Rabe, M. Halstensen. 2012 , Estimation of Volume fractions and flow regime identification in multiphase flow based on gamma measurements and multivariate calibration, Flow Measurement and Instrumentation, 23 (2012) 56-65.

\* cited by examiner

WATER TREATMENT SYSTEM FOR TREATING WATER FROM OIL PRODUCTION STREAMS

TECHNICAL FIELD

The field to which the disclosure generally relates to includes water treatment systems for oil production streams, components for such water treatment systems, and methods of using the same.

BACKGROUND

An oil well may produce a mixture including oil, water, and gas. The water may be separated from the oil and gas, and then discharged. This presents potential pollution issues, however, as it can be difficult to separate the oil from the water completely. Therefore, the discharged water may contain an amount of oil that has a negative impact on the environment.

In current applications, discharged water may be sampled and tested, and then various operating parameters of equipment facilitating the processing and discharging of the water may be adjusted. While this can help to reduce the oil content of the discharged water, due to tightening environmental restrictions, and due to newer oil wells being drilled in environmentally sensitive areas, further advances in the processing and discharging of water produced from oil wells are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A water treatment system is disclosed herein. The water treatment system may include an inlet line, and a tank in fluid communication with the inlet line to receive therefrom a fluid flow of hydrocarbons and water. The tank may have components configured to separate the fluid flow into a hydrocarbon flow and a water flow, with the water flow including a residual amount of hydrocarbons. A first outlet line may be in fluid communication with the tank to discharge therefrom the water flow. A second outlet line may be in fluid communication with the tank to discharge therefrom the hydrocarbon flow. In addition, a sensor may be associated with the inlet line and/or the first outlet line and/or the second outlet line. A valve may be associated with the second outlet line. A controller may be configured to determine a property of the fluid flow and/or the hydrocarbon flow and/or the water flow using the sensor, and to control the valve based upon the property so as to reduce the residual amount of hydrocarbons in the water flow.

A method aspect is directed to a method of operating a water treatment system. The method may include receiving into a tank a fluid flow of hydrocarbons and water via an inlet line, and separating the fluid flow into a hydrocarbon flow and a water flow, with the water flow including a residual amount of hydrocarbons. The water flow may be discharged from the tank using a first outlet line. The hydrocarbon flow may be discharged from the tank using a second outlet line. A property of the fluid flow and/or the water flow and/or the hydrocarbon flow may be determined using a controller, which may in turn be coupled to a sensor associated with the inlet line and/or the first outlet line and/or the second outlet line. The valve may be controlled based upon the property so as to reduce the residual amount of hydrocarbons in the water flow, using the controller.

Another aspect is directed to a system that may include an inlet line having an inlet line sensor and an inlet line valve associated therewith. There may be a tank in fluid communication with the inlet line to receive therefrom a fluid flow of hydrocarbons and water. The tank may be configured to separate the fluid flow into a hydrocarbon flow and a water flow, and the water flow may include a residual amount of hydrocarbons. A water outlet line may be in fluid communication with the tank to discharge therefrom the water flow, and may have a water outlet line sensor and a water outlet line valve associated therewith. In addition, a hydrocarbon outlet line may be in fluid communication with the tank to discharge therefrom the hydrocarbon flow, and may have a hydrocarbon outlet line sensor and a hydrocarbon outlet line valve associated therewith. There may be a controller configured to determine a property of the fluid flow using the inlet line sensor, determine a property of the water flow using the water outlet line sensor, and determine a property of the hydrocarbon flow using the hydrocarbon outlet line sensor. The controller may also be configured to control the inlet line valve, water outlet line valve, and/or hydrocarbon outlet line valve based upon the property so as to reduce the residual amount of hydrocarbons in the water flow, based upon the property of the fluid flow, the property of the water flow, and the property of the hydrocarbon flow.

DETAILED DESCRIPTION

The following description of the aspects of this disclosure is merely illustrative in nature and is in no way intended to limit the scope of this disclosure, its application, or uses. These described aspects are merely examples of the presently disclosed techniques. Additionally, in an effort to provide a concise description, certain features of an actual implementation may not be described in the specification. It should be appreciated that in the development of the various aspects, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Figure 1:
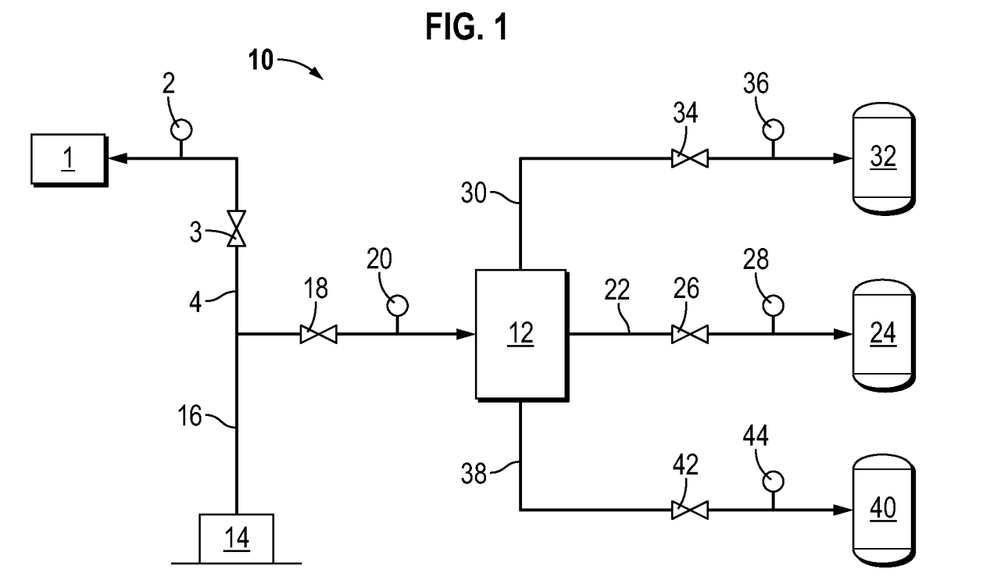
FIG. 1 is a schematic block diagram of a water treatment system according to this disclosure.

A water treatment system 10 wherein one or more sensors and/or valves are automatically controlled is now described with reference to FIG. 1. The water treatment system 10 includes a fluid separation device 12, which is connected to a fluid source 14 (such as an oil well, or a fluid source providing slop-water, condensed water, or drainage water) via an inlet line 16 to receive a fluid flow therefrom. In some applications, the separation device 12 may be a separation tank, such as a compact flotation device. A first inlet valve 18 is illustratively connected to the inlet line 16 to control the flow of the fluid therethrough, although it should be understood that the first inlet valve is optional and may not be present in some applications. A first sensor 20 is connected to the inlet line 16 downstream of the first inlet valve 18 and is configured to sense a property of the fluid flowing through the inlet line 16 such as, but not limited to, density, flow rate, pressure, temperature, and concentrations of oil, water, and/or gas. It should be appreciated, however, that the first sensor 20 could be connected upstream of the first inlet valve 18 in some applications.

A flotation gas line 4 is connected to the inlet line 16, illustratively upstream of the valve 18, although it could be connected downstream of the valve 18 in some applications. The junction between flotation gas line 4 and the inlet line 16 mixes the fluid in the inlet line 16 with flotation gas from a flotation gas source 1. This serves to cause at least some of the oil in the fluid to float on top of the water, so that it may be more easily removed by the separation device 12. A floation gas sensor 2, such as a flow meter, is connected downstream of the flotation gas source 1, and measures desired properties of the flotation gas, such as flow rate. A floation gas valve 3 is connected downstream of the flotation gas sensor 2, although in some applications it could be connected upstream of the flotation gas sensor. The flotation gas valve allows for control of the flow rate in the flotation gas line 4.

The separation device 12 separates water from the fluid entering through the inlet line 16, and discharges the water to a first outlet line 22. The first outlet line 22 illustratively connects the separation device 12 to a first storage device 24, but in some applications, the first outlet line may be configured so as to discharge fluid undersea, on land, or to a suitable reservoir. A first outlet valve 26 is connected to the first outlet line 22 upstream of the first storage device 25 to control the flow of fluid thereto.

Since it may be difficult to fully separate oil from water, the discharged fluid flowing through the first outlet line 22 from the separation device 12 may also include oil. A first outlet sensor 28 is connected to the first outlet line 22 downstream of the first outlet valve 26, although in some applications the first outlet sensor could be connected upstream of the first outlet valve. The first outlet sensor 28 is configured to sense a property associated with fluid flowing through the first outlet line 22, such as density, flow rate, pressure, temperature, and concentrations of oil, water, and/or gas. If the amount or concentration of oil flowing through the first outlet 22 equals or exceeds a threshold value, then the first outlet valve 26 and/or the inlet valve 18 may be actuated and adjusted so as to reduce or prevent the flow of fluid through the first outlet line 22.

The separation device 12 also separates gas from the fluid entering through the inlet line 16, and discharge the gas to a second outlet line 30. The second outlet line 30 connects the separation device 12 to a second storage unit 32. A second outlet valve 34 is connected to the second outlet line 30 upstream of the second storage unit 32 to control the flow of fluid thereto. A second sensor 36 is connected to the second outlet line 30 downstream of the second outlet valve 34, and is configured to measure a property of the fluid flowing through the second outlet line. Sample properties include density, flow rate, pressure, temperature, and concentrations of oil, water, and/or gas. The second sensor 36 may be a mass flowmeter, and may measure the mass flow rate of the fluid flowing through the second outlet line 30 by calculating the density of the fluid. It should be understood that in some applications, the second sensor 36 may be connected to the second outlet line 30 upstream of the second outlet valve 34.

Since it may be difficult to fully separate oil from gas, oil may also flow through the second outlet line 30. If the amount or concentration of oil flowing through the second outlet line 30 equals or exceeds a threshold value, the second outlet valve 34 and/or the inlet valve may be actuated and adjusted so to reduce or prevent the flow of fluid through the second outlet line 30.

The separation device also separates sludge and other heavy components from the fluid of the inlet line 16, and discharges the sludge and other heavy components to a third outlet line 38. The third outlet line 38 connects the separation device 12 to a third storage container 40. A third outlet valve 42 is connected to the third outlet line 38 to control the flow of fluid therethrough. A third outlet sensor 44 is connected to the third outlet line 38 downstream of the third outlet valve 42, although in some applications it may be connected upstream of the third outlet valve. The third outlet sensor 44 is configured to a property of the flow flowing through the third outlet line 38. Samples properties include density, flow rate, pressure, temperature, and concentrations of oil, water, and/or gas.

Since it may be difficult to fully separate oil from sludge and other heavy components, oil may also flow through the third outlet line 38. If the amount or concentration of oil flowing through the third outlet line 38 equals or exceeds a threshold value, the third outlet valve 42 and/or the inlet valve 18 may be actuated and adjusted so to reduce or prevent the flow of fluid through the third outlet line 38.

Figure 2:
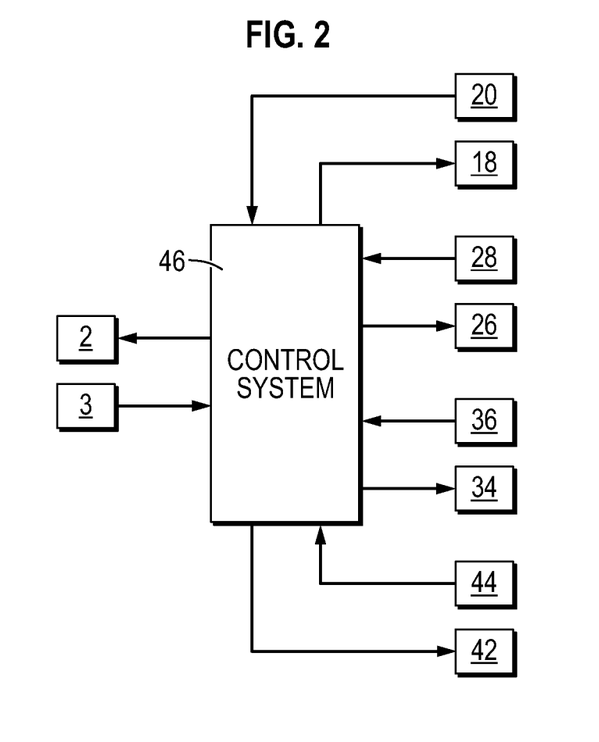
FIG. 2 is a schematic block diagram of a control system for use with the water treatment systems disclosed herein.

With reference to FIG. 2, a control system 46 that receives input from one or more of the sensors 20, 28, 36, 44, 1 detailed above, and that controls one or more of the valves 18, 26, 34, 42, 3 detailed above, is now described. The control system 46 may be hardwired to the sensors 20, 28, 36, 44, 1 and the valves 18, 26, 34, 42, 3 may be connected to the sensors and valves via a telecommunications system, may be wirelessly connected to the sensors and valves, or may employ a mix of hardwired, telecommunications, and wireless connections with the sensors and valves. The control system 46 may be located at the same site as the valves 18, 26, 34, 42 and sensors 20, 28, 36, 44, or may be remotely located. The inputs from the sensors 20, 28, 36, 44, 1 may be directly or indirectly communicated to the control system 46, and the control system may directly or indirectly control the valves 18, 26, 34, 42, 3 based upon the inputs from the sensors.

The control system 46 may allow the water treatment system (of FIG. 1) to make quick and reliable adjustments, and may thus reduce the amount of oil undesirably discharged with the water, gas, or sludge and heavies. For example, the control system 46 may monitor the sensors 20, 38, 36, 44, 1 continuously and adjust the valves 18, 26, 34, 42, 3 continuously, or may monitor the sensors at certain intervals and adjust the valves at certain intervals. In addition, the control system 46 may allow the water treatment system (of FIG. 1) to be unmanned, conserving resources.

The control system 46 may include, for example, an electrical circuit, an electronic circuit or chip, and/or a computer. In an illustrative computer variation, the control system generally include one or more processors, memory devices that may be coupled to the processor(s), and one or more interfaces coupling the processor(s) to one or more other devices. Although not shown, the processor(s) and other powered system devices may be supplied with electricity by a power supply, for example, one or more generators, batteries, fuel cells, or other power source(s).

The processor may execute instructions that provide at least some of the functionality described for the control system 46. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the memory device may be configured to provide non-transitory storage for data received by or loaded to the system, and/or for processor-executable instructions. The data and/or instructions may be stored, for example, as look-up tables, formulas, algorithms, maps, models, and/or any other suitable format, in the non-transitory storage. To that end, the memory may include, for example, RAM, ROM, EPROM, and/or any other suitable type of storage device.

Further, the interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, CAN, MOST, LIN, FlexRay, and/or any other suitable protocol(s). The interfaces may include circuits, software, firmware, or any other device to assist or enable the controller in communicating with other devices.

Software according to which the control system 46 operates may be implemented in a computer program product including instructions carried on a non-transitory computer readable medium for use by one or more processors of one or more computers to implement one or more of the method acts. The computer program product may include the software, which may be comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one computer or on multiple computers in communication with one another.

The non-transitory computer readable media can include one or more storage devices, articles of manufacture, or the like. Illustrative computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also remote storage devices, such as servers. Any combination(s) of the above examples is also included within the scope of the computer-readable media.

Figure 3:
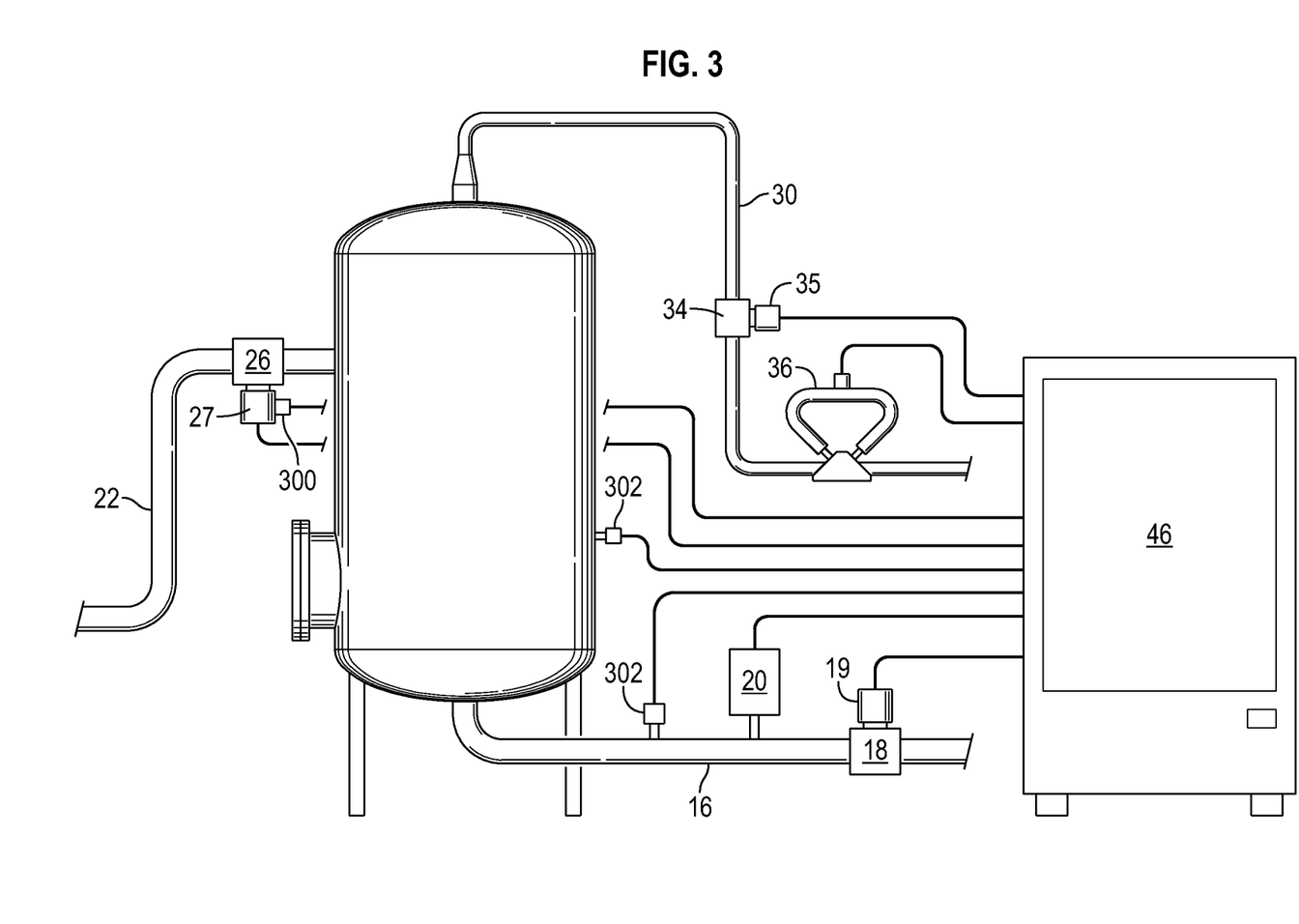
FIG. 3 is a schematic block diagram of another water treatment system according to this disclosure.

With reference to FIG. 3, a further example of a water treatment system 10 is now described. Here, an inlet valve actuator 27 is operatively associated with the inlet valve 26 to adjust the inlet valve to control fluid flow through the inlet line 22. A first outlet valve actuator 19 is operatively associated with the first outlet valve 18 to adjust the first outlet valve. A second outlet valve actuator 35 is operatively associated with the second outlet valve 34 to adjust the second outlet valve. The actuators 19, 27, and 35 may be operated by pneumatic, hydraulic, electric, or other suitable methods, which may be controlled by the control system (of FIG. 2). It should be noted that in this example, there are first and second outlet lines 16, 30, although the water treatment system 10 may thus have any number of outlet lines in other applications.

Here, the second outlet sensor 36 is a mass flow meter. The mass flow meter 36 is illustratively a curved tube with a mass measuring device associated therewith that is in turn coupled to the control system (of FIG. 2). The mass measuring device measures the mass of the fluid in the curved tube, calculates the density of the fluid in the curved tube.

Those of skill in the art will understand that optional flow elements 300 may be connected to the inlet line 22, or any of the outlet lines 30, 38 so as to implement flow control loop(s). The optional flow elements 300 may include other sensors, such as pressure or temperature sensors 302.

The water treatment system 10 may include additional devices and components upstream and/or downstream of the separation device that may be controlled and optimized by the control system (of FIG. 2). For example, one or more additional separator tanks, hydrocyclone/PW separators, degasser/flotation devices, and chemical charge lines may be provided to aid in the separation of phases and materials.

Figure 4:
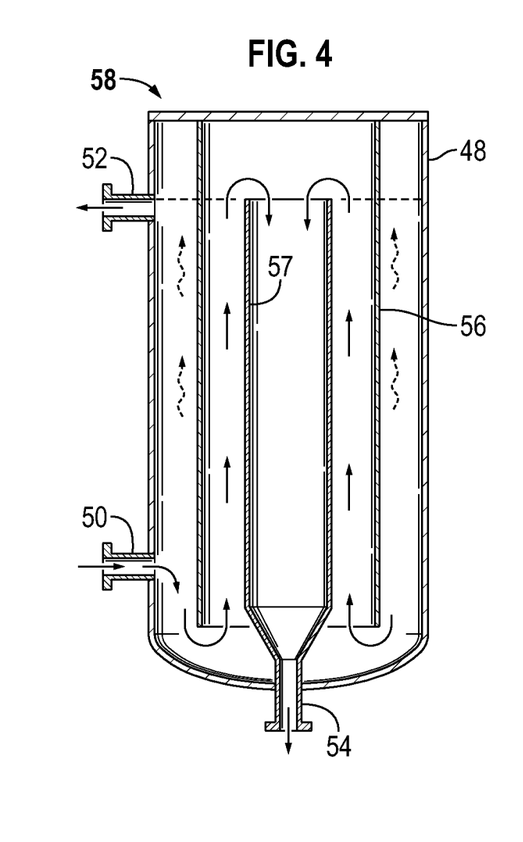
FIG. 4 is a sectional schematic illustration of a compact flotation unit tank for use with the water treatment systems disclosed herein.

The separation device 12 may be a compact flotation unit. Any suitable variation of a compact flotation unit may be used. For example, one suitable compact flotation unit 58 is shown in FIG. 4. The compact flotation unit 58 includes a tank 48 with an inlet 50 for receiving the fluid from the source (of FIG. 1), a first outlet line 52 for oil and gas, and second outlet line 54 for water and oil. The tank 48 includes an outer baffle 56 to cause the incoming fluid to rotate, creating a centrifugal force which forces the lighter oil drops towards the outer baffle where they may coalesce to form larger drops that eventually rise and are gathered on top of the liquid between the wall of the tank 48 and the outer baffle 56. The oil is removed via the first outlet 52 for oil and gas. Water may be forced down under the outer baffle 56 and up between the outer baffle and an inner baffle 57, through the interior space defined by the inner baffle, and then out the second outlet 54.

Figure 5:
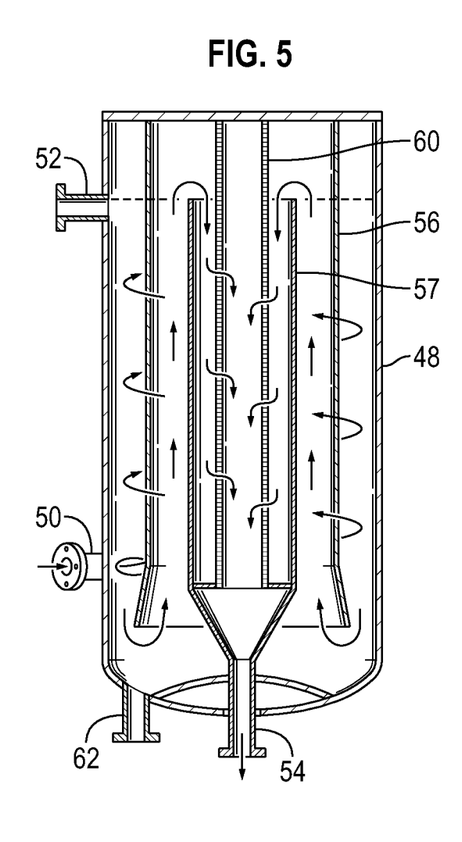
FIG. 5 is a sectional schematic illustration of another compact flotation unit tank for use with the water treatment systems disclosed herein

Another suitable compact flotation unit 58 is shown in FIG. 5. In addition to components similar to that of the compact flotation unit 58 of FIG. 4, the tank 48 of this compact flotation unit 58 includes a screen 60 associated with the inner baffle 57 to limit fluid flow, and thus regulate the water level in the compact flotation device. The tank 48 contains a drain outlet 62 for maintenance purposes.

Figure 6:
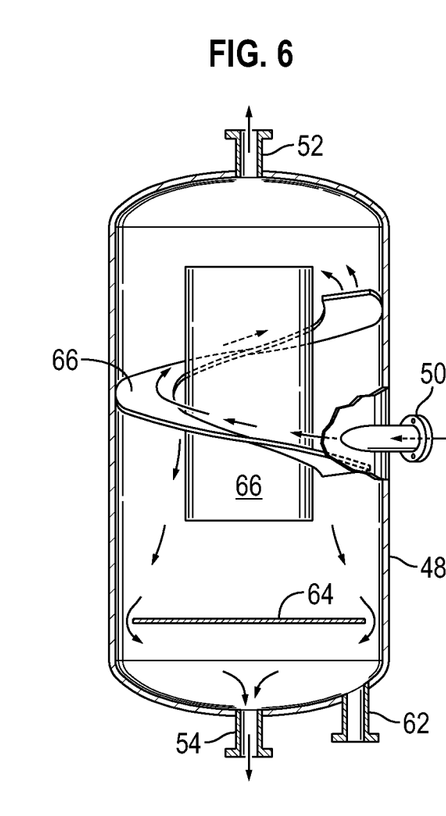
FIG. 6 is a sectional schematic illustration of a further compact flotation unit tank for use with the water treatment systems disclosed herein

Yet another suitable compact flotation unit 58 is shown in FIG. 6. This compact flotation unit 58 performs flotation as well as degassing operations, and includes an inner cylinder 66 in the upper portion of the tank 48, leaving an open space between the inner cylinder of the top of the tank. An inlet guide vane 68 is positioned between the inner wall of the tank 48 and the inner cylinder, leaving an open space between the inlet guide vane and the inner cylinder 66. A horizontal circular plate or "china hat" 64 is positioned toward the bottom of the tank 48 and leaves a passage for water to travel between the horizontal circular plate and the wall of tank, and out the second outlet 54.

Figure 7:
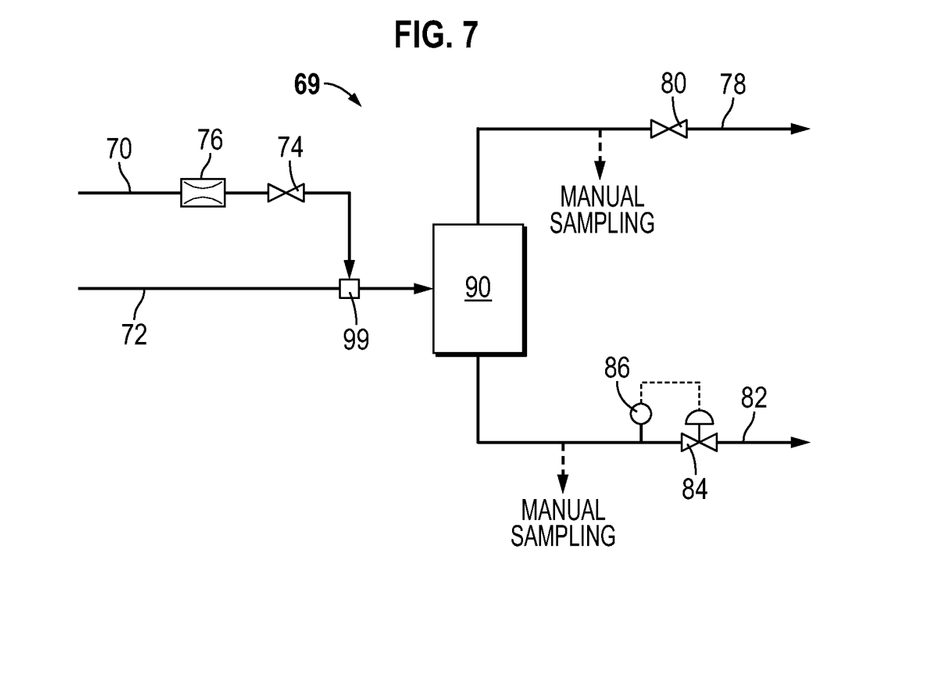
FIG. 7 is a schematic block diagram of a further water treatment system according to this disclosure.

Another application of a water treatment system 69 is now described with reference to FIG. 7. A mixing junction 99 receives oily water via a first inlet line 72, and flotation gas via a second inlet line 70, and then mixes the oily water with the flotation gas so as to facilitate the floating of the oil at the top of the water. A flow meter 76 measures the flow of flotation gas through the inlet line 70, and a valve 76 is operable to control the flow of flotation gas through the inlet line.

The mixing junction 99 passes the oily water as mixed with the flotation gas to a compact flotation unit 90. Oil and other undesirable materials are withdrawn from the top of the compact flotation unit 90 via a first outlet line 78. A valve 80 is operable to control the flow of the oil and other undesirable materials through the first outlet line 78. The fluid in the first outlet line 78 is approximately 80% to 95% gas, with the remainder being water and oil, and has a slug flow pattern.

Clean water is withdrawn from the bottom of the compact flotation unit 90 via a second outlet line 82. A sensor 86 is associated with the second outlet line 82 to measure at least one property of the fluid in the second outlet line, and a valve 84 is associated with the second outlet line to control the flow of the fluid therethrough.

A controller (not shown) is coupled to the flow meter 76, and sensor 86, and controls the valves 74, 80, and 84 based upon the at least one property of the fluid in the second outlet line 82 and based upon the flow rate of the fluid in the second inlet line 70 so as to reduce the oil and gas content of the clean water in the second outlet line 82. For example, the at least one property of the fluid in the second outlet line 82 may be the flow rate, and the controller (not shown) may control the valves 80 and/or 74 based thereupon.

This controlling of the valves 84 and/or 80 based upon the flow rate of the fluid in the second outlet line 82 may be performed such that the flow rates through the valves increase or decrease proportionally with the flow rate of the fluid in the second outlet line. For example, if the flow rate of the fluid in the second outlet line 82 increases by 30%, the controller (not shown) may control the valves 80, 74 so as to increase the fluid flow therethrough by 30%.

An initial calibration may be performed by the controller (not shown) wherein the controller maintains the valve 84 constant, and also maintains one of the valves 80, 74 at a constant setting, while controlling the other valve so as to vary the flow rate therethrough. By monitoring the at least one property of the fluid in the second outlet line 82 while varying the flow rate through one of the valves 80, 74, the controller (not shown) may find an effective setting for that valve. The controller may then (not shown) maintain the valve 80, 74 for which the effective setting has been found at the effective setting while controlling the other valve so as to vary the flow rate therethrough. By monitoring the at least one property of the fluid in the second outlet line 82 while varying the flow rate through the other valve 80, 74, the controller (not shown) may find an effective setting for that valve. Thereafter, the valves 80, 74 may be controlled proportionally as discussed above.

Figure 8:
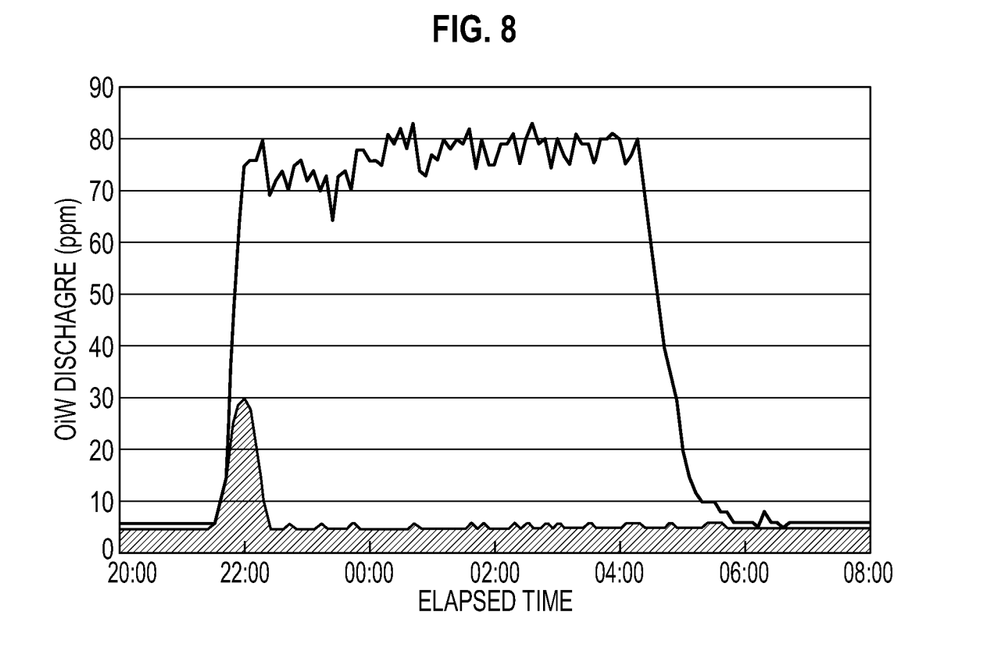
FIG. 8 is a graph comparing the oil content of water discharged from the water treatment systems disclosed herein to the oil content of water discharged from conventional water treatment systems.

The use of the water treatment systems disclosed herein serves to lower the oil and/or hydrocarbon content of discharged water compared to that of discharged water from conventional water treatment systems. A graph showing the oil content of discharged water from the water treatment systems disclosed herein vs. the oil content of discharged water from conventional water treatment systems is shown in FIG. 8. As shown in the graph, due to the active control by the controller, a spike in the oil and/or hydrocarbon content of discharged water can be addressed rapidly using the water treatment systems disclosed herein.

While the disclosure has been described with respect to a limited number of aspects, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A water treatment system comprising:
   an inlet line;
   a flotation gas line connected to the inlet line;
   a tank in fluid communication with the inlet line to receive therefrom a fluid flow comprising hydrocarbons and water and flotation gas, the tank comprising components configured to separate the fluid flow into a hydrocarbon flow and a water flow, the water flow including a residual amount of hydrocarbons;
   a first outlet line in fluid communication with the tank to discharge therefrom the water flow;
   a second outlet line in fluid communication with the tank to discharge therefrom the hydrocarbon flow;
   a sensor directly connected to one of the inlet line, the first outlet line, and the second outlet line;
   a valve associated with the second outlet line; and
   a controller configured to determine a property of at least one of the fluid flow, the hydrocarbon flow, and the water flow using the sensor, and to control the valve based upon the property so as to reduce the residual amount of hydrocarbons in the water flow.

2. The water treatment system of claim 1, wherein the property comprises a flow rate of the water flow; and wherein the controller is configured to control the valve based upon the flow rate of the water flow.

3. The water treatment system of claim 2, wherein the controller is configured to control the valve proportionally based upon the flow rate of the water flow.

4. The water treatment system of claim 1, wherein the property of at least one of the fluid flow and the water flow comprises hydrocarbon content thereof and wherein the controller is configured to compare the hydrocarbon content of at least one of the fluid flow and the water flow to a threshold value, and to restrict fluid flow through the valve based upon the hydrocarbon content being at least the threshold value.

5. The water treatment system of claim 4, wherein the controller is configured to restrict the fluid flow through the valve based upon the hydrocarbon content being less than the threshold value.

6. The water treatment system of claim 1, wherein the sensor comprises an inlet sensor directly connected to the inlet line; further comprising an outlet sensor directly connected to the first outlet line; wherein the valve comprises an outlet valve associated with the second outlet line; and wherein the controller is configured to determine a property of the fluid flow and a property of the water flow using the inlet sensor and the outlet sensor, and to control the outlet valve based upon the property of the fluid flow and the property of the water flow.

7. The water treatment system of claim 1, further comprising an actuator to actuate the valve, and being controlled by the controller.

8. A method of operating a water treatment system comprising:
receiving into a tank an inlet fluid flow comprising hydrocarbons, flotation gas, and water via an inlet line;
separating the inlet fluid flow into a hydrocarbon flow and a water flow, the water flow including a residual amount of hydrocarbons;
discharging the water flow from the tank using a first outlet line;
discharging the hydrocarbon flow from the tank using a second outlet line;
determining a property of at least one of the fluid flow, the hydrocarbon flow, and the water flow using a controller coupled to a sensor directly connected to one of the inlet line, the first outlet line, and the second outlet line; and
controlling a valve associated with the second outlet line based upon the property so as to reduce the residual amount of hydrocarbons in the water flow, using the controller.

9. The method of claim 8, wherein the property of at least one of the fluid flow and the water flow comprises hydrocarbon content thereof.

10. The method of claim 9, further comprising comparing the hydrocarbon content of at least one of the fluid flow and the water flow to a threshold value, using the controller; and wherein controlling the valve comprises controlling the valve to restrict fluid flow through the valve based upon the hydrocarbon content being at least the threshold value, using the controller.

11. The method of claim 10, wherein controlling the valve further comprises controlling the valve to restrict the fluid flow through the valve based upon the hydrocarbon content being less than the threshold value, using the controller.

12. The method of claim 8, wherein the sensor comprises an inlet sensor directly connected to the inlet line; wherein an outlet sensor is directly connected to the first outlet line; wherein the valve comprises an outlet valve associated with the second outlet line; and wherein determining a property of at least one of the fluid flow and the water flow comprises:
determining a property of the fluid flow and a property of the water flow using the controller in cooperation with the inlet sensor and the outlet sensor; and
controlling the outlet valve based upon the property of the fluid flow and the property of the water flow.

13. The method of claim 8, wherein the property comprises at least one of a fluid density, a fluid flow rate, a fluid pressure, and a fluid temperature.

14. The method of claim 8, further comprising receiving the fluid flow into the inlet line from an oil well.

15. The method of claim 8, further comprising pumping at least one of slop-water, condensed water, and drainage water into the inlet line as the fluid flow.

16. A system comprising:
an inlet line having an inlet line sensor and an inlet line valve associated therewith;
a flotation gas source connected to the inlet line;
a tank in fluid communication with the inlet line to receive therefrom a fluid flow comprising hydrocarbons and water and flotation gas, the tank configured to separate the fluid flow into a hydrocarbon flow and a water flow, the water flow including a residual amount of hydrocarbons;
a water outlet line in fluid communication with the tank to discharge therefrom the water flow, and having a water outlet line sensor and a water outlet line valve directly connected thereto;
a hydrocarbon outlet line in fluid communication with the tank to discharge therefrom the hydrocarbon flow, and having a hydrocarbon outlet line sensor and a hydrocarbon outlet line valve directly connected thereto; and
a controller configured to:
determine a property of the fluid flow using the inlet line sensor,
determine a property of the water flow using the water outlet line sensor,
determine a property of the hydrocarbon flow using the hydrocarbon outlet line sensor, and
control at least one of the inlet line valve, water outlet line valve, and hydrocarbon outlet line valve so as to reduce the residual amount of hydrocarbons in the water flow, based upon the property of the fluid flow, the property of the water flow, and the property of the hydrocarbon flow.

17. The system of claim 16, wherein the property of the fluid flow, the property of the water flow, and the property of the hydrocarbon flow comprises hydrocarbon content thereof; wherein the controller is configured to:
compare the hydrocarbon content of the fluid flow, the water flow, and the hydrocarbon flow to respective threshold values, and
restrict fluid flow through at least one of inlet line valve, water outlet line valve, and hydrocarbon outlet line valve based upon the hydrocarbon content of at least one of the fluid flow, the water flow, and the hydrocarbon flow being at least the threshold value.

18. A water treatment system comprising:
an inlet line;
a flotation gas source comprising a flotation gas inlet line connected to the inlet line by a mixing junction;
a tank in fluid communication with the inlet line to receive therefrom a fluid flow comprising hydrocarbons and water and flotation gas, the tank comprising components configured to separate the fluid flow into a hydrocarbon flow and a water flow, the water flow including a residual amount of hydrocarbons;
a first outlet line in fluid communication with the tank to discharge therefrom the water flow;
a second outlet line in fluid communication with the tank to discharge therefrom the hydrocarbon flow
a sensor directly connected to one of the inlet line, the first outlet line, the second outlet line, and the flotation gas inlet line;
a valve associated with one of the flotation gas inlet line and the second outlet line; and
a controller configured to determine a property of at least one of the fluid flow, the hydrocarbon flow, and the water flow using the sensor, and to control the valve based upon the property so as to reduce the residual amount of hydrocarbons in the water flow.

19. The water treatment system of claim 18, wherein the property comprises a flow rate of the water flow; wherein the valve is associated with the flotation gas inlet line; and wherein the controller is configured to control the valve based upon the flow rate of the water flow.

20. The water treatment system of claim 19, wherein the controller is configured to control the valve proportionally based upon the flow rate of the water flow.

21. The water treatment system of claim 1, further comprising a third outlet line in fluid communication with the tank, a sensor connected to the third outlet line, and valve associated with the third outlet line and controlled by the controller.

22. The water treatment system of claim 1, wherein the sensor is a mass flow meter.

23. The water treatment system of claim 1, wherein a first sensor is directly connected to the inlet line, a second sensor is directly connected to the first outlet line, and a mass flow meter is directly connected to the second outlet line, and the controller is configured to control the valve using the first sensor, the second sensor, and the mass flow meter.

24. The water treatment system of claim 1, wherein the controller is a control system that is remotely located.

25. The water treatment system of claim 1, further comprising a valve associated with the flotation gas line, wherein the controller is further configured to control the valve associated with the flotation gas line based upon the property.

26. The water treatment system of claim 25, further comprising a sensor connected to the flotation gas line.

27. The water treatment system of claim 26, wherein the controller is further configured to control the valve associated with the flotation gas line using the sensor connected to the flotation gas line.

28. The water treatment system of claim 16, further comprising a flotation gas sensor and flotation gas valve connected between the flotation gas source and the inlet line, wherein the controller is further configured to determine a property of the flotation gas using the flotation gas sensor and control the flotation gas valve.

* * * * *